J. A. SCOTT AND J. S. VOIGT.
TIRE LOCK.
APPLICATION FILED NOV. 3, 1919.
1,347,467.
Patented July 20, 1920.
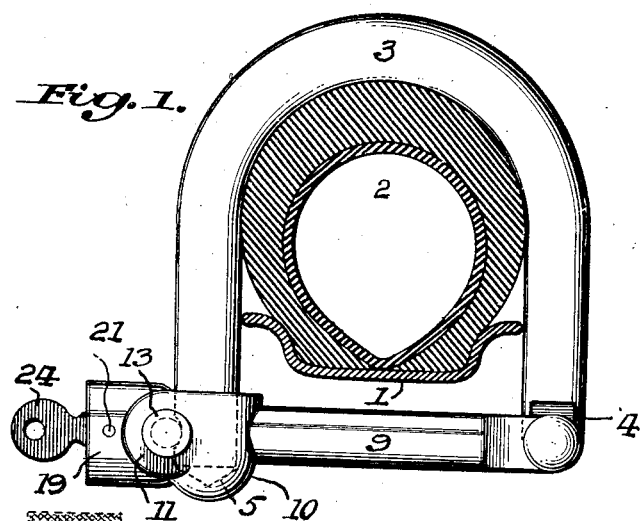
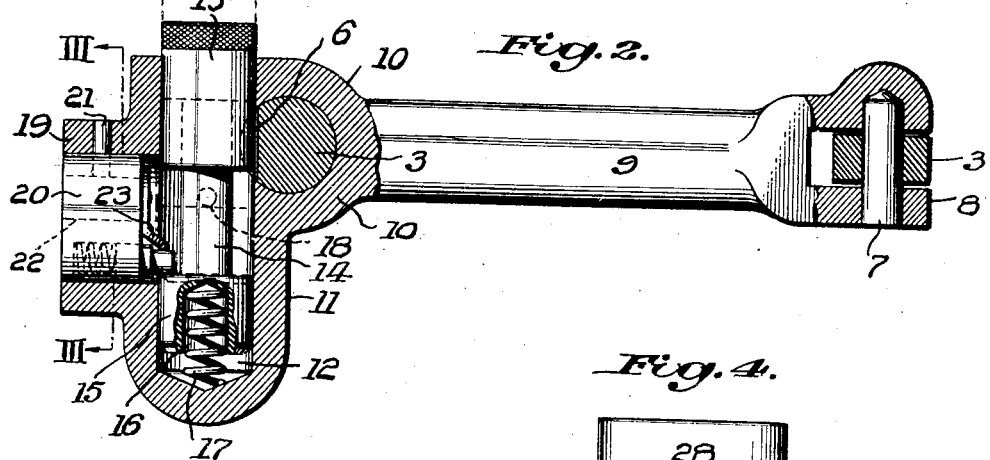
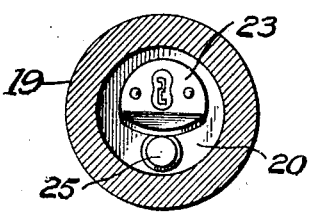
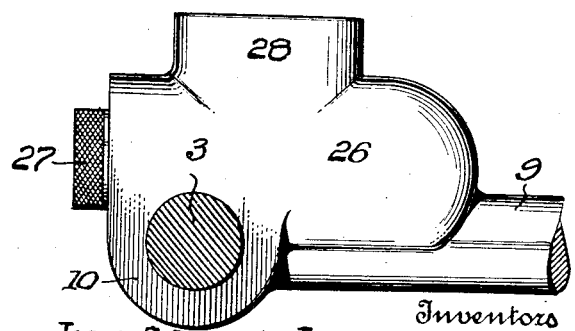
Inventors
JOSEPH A. SCOTT and JOHNSTON STUART VOIGT,
By
Attorneys

UNITED STATES PATENT OFFICE.

JOSEPH A. SCOTT AND JOHNSTON STUART VOIGT, OF DETROIT, MICHIGAN, ASSIGNORS OF ONE-THIRD TO JOHNSTON STUART, OF DETROIT, MICHIGAN.

TIRE-LOCK.

1,347,467.  Specification of Letters Patent.  Patented July 20, 1920.

Application filed November 3, 1919. Serial No. 335,235.

*To all whom it may concern:*

Be it known that we, JOSEPH A. SCOTT and JOHNSTON STUART VOIGT, citizens of the United States of America, residing at Detroit, in the county of Wayne and State of Michigan, have invented certain new and useful Improvements in Tire-Locks, of which the following is a specification, reference being had therein to the accompanying drawings.

This invention relates to a tire lock, and has special reference to that type of lock embodying a shackle and a locking bar or lock body having one end thereof pivotally connected to the shackle and the opposite end thereof adapted to be held relative to the shackle so as to inclose the same and thus provide a member which may surround a tire, tire carrier or any other devices to be held together or in proximity to each other.

The primary object of our invention is to provide a shackle lock of the above type that may be advantageously used by automobilists for locking spare tires on carriers and thus prevent the tire from being surreptitiously used or stolen. The shackle lock is portable and may be easily and quickly placed in position to positively prevent the theft or accidental displacement of a tire relative to its carrier.

Another object of our invention is to provide a shackle lock with a novel lock body in which a bolt is arranged to hold the shackle relative to the lock body, the bolt being held in a locked position by a key actuated mechanism which is compactly assembled relative to the lock body.

A further object of our invention is to provide a lock wherein the parts are constructed with a view of reducing the cost of manufacture and at the same time retain those features by which simplicity of construction, durability and ease of assembling are secured. With such ends in view our invention resides in the novel construction to be hereinafter specifically described and then claimed.

Reference will now be had to the drawing, wherein—

Figure 1 is a side elevation of the lock relative to the tire and

Fig. 2 is an enlarged horizontal sectional view of the lock;

Fig. 3 is a cross sectional view taken on the line III—III of Fig. 2, and

Fig. 4 is a plan of the lock illustrating a slight modification of our invention.

As an instance of the use of the lock, we have illustrated a conventional form of tire carrier 1 for a spare tire 2 and in illustrating these two devices, it is to be understood that the same are intended as an example of various types of carriers, tires or other devices adapted to be held together or in proximity to each other. The lock which we have devised for preventing accidental displacement of the tire 2 relative to the carrier 1 comprises a shackle 3 having one end thereof reduced and apertured, as at 4, and the opposite end thereof provided with a tapered extremity 5 and a side notch 6.

Pivotally connected to the reduced apertured end 4 of the shackle 3 by a pin 7 or other pivotal means is the bifurcated or forked end 8 of a locking bar or gate 9, which is adapted to close the entrance to the shackle 3.

The free end of the locking bar or gate 9 terminates in a socket 10 to receive the extremity of the shackle 3, and formed integral with the socket 10 is a transversely disposed lock body 11 having a tubular bore 12 with one end thereof open so as to receive a locking bolt 13 which is reciprocable in the bore 12 and normally protrudes from the open end of the lock body where it is knurled or otherwise roughened to permit of the fingers easily gripping the bolt. The bore 12 of the lock body 11 intersects the socket 10, so that a portion of the bolt 13 will protrude into the socket and extend into the side notch 6 of the shackle when the locking bar or gate 9 is closed, thereby holding the locking bar or gate relative to both ends of the shackle. Since the extremity of the shackle is tapered it is possible to readily guide the shackle into the socket or the socket on to the shackle.

The reciprocable bolt 13 has a stem 14 terminating in a head 15, and said head is recessed, as at 16, to receive end convolutions of a coiled expansion spring 17 which is located within the inner end of the lock body 11 and is adapted to have its expansive force shift the bolt 13 to an extended or unlocked position as shown by dotted lines in Fig. 2, so that the bolt 13 may release the end of the shackle. The outward movement of the bolt 13 relative to the lock body 11 is limited by a stop or stud 18 mounted in the lock body 11 and extending in the bore 12 thereof at the stem portion 14 of the bolt, so that said stop will be in the path of the head 15 and thus limit the outward movement of said bolt.

The lock body 11 has a cylindrical housing 19 for a key operated lock 20, said lock being retained within the housing 19 by a pin 21, or other securing means. The key operated lock 20 includes a barrel 22 and a cam 23, both of which are adapted to be moved by a key 24. In the lock 20 is a spring pressed pin 25 adapted to extend into the path of the bolt head 15 and hold said bolt in a retracted position while the spring 17 is under tension. The spring pressed pin 25 is in the path of the cam 23 and said pin may be retracted, to release the bolt 13, by rotating the barrel 22 and the cam 23. The cam 23 will ride against the pin 25 and force the same inwardly so that in its retracted position the bolt 13 will be released and caused, by the action of the spring 17, to assume an extended or unlocked position to release the end of the shackle. With the cam 23 properly set, after the bolt 13 is in an unlocked position, the end of the shackle may be placed in the socket 10 and then the bolt 13 manually pushed inwardly until the spring pressed pin 25 snaps against the head 15 of the bolt, at which time it will be locked and consequently the end of the shackle engaged thereby.

As shown in the preferred form of construction the lock body 11 is disposed at a right angle or transversely of the socket 5, but as shown in Fig. 4, a lock body 26 may be formed integral with the socket 10 in a plane parallel with the axis of the locking bar or gate 9; the lock body 26 having a bolt 27 and a lock housing 28, similar to the bolt 13 and the housing 19 previously mentioned.

It is thought that the utility of our invention will be apparent without further description, and we would have it understood that in some instances the spring pressed pin 25 may be dispensed with and the cam 23 used for holding the bolt in a retracted position. Other changes may also be made without departing from the scope of the invention as defined by the appended claims.

What we claim is:

1. A lock of the type described comprising a shackle, a locking bar having one end thereof pivotally connected to one end of said shackle, a socket carried by the opposite end of said locking bar and adapted to receive the other end of said shackle, a lock body carried by said socket, a reciprocable bolt in said lock body adapted to engage the end of the shackle in said socket, and means carried by said lock body adapted to retain said bolt in a retracted position in engagement with the end of said shackle.

2. A lock as characterized in claim 1, and wherein said means includes a pin to engage said bolt and a key operated cam to engage said pin.

3. A lock of the type described comprising a shackle, a locking bar pivotally connected to said shackle, a lock casing carried by said locking bar, a reciprocable bolt in said body and adapted to engage said shackle to maintain said locking bar in a closed position, means carried by said lock body to limit the movement of said bolt, and means carried by said lock body adapted to retain said bolt in a retracted locked position.

4. A lock of the type described comprising a shackle having a notched extremity, a locking bar pivotally connected to one end of said shackle, a socket carried by said locking bar adapted to receive the notched extremity of said shackle, a lock body forming part of said socket, a reciprocable spring pressed bolt in said lock body adapted to engage in the notch of the shackle extremity, and means carried by said lock body adapted for engagement with said bolt to retain said bolt in a retracted locking position.

5. A lock of the type described comprising a shackle, a locking bar pivotally connected to one end thereof, a lock body carried by said locking bar and provided with a bore adapted to be intersected by the free end of said shackle, a reciprocable bolt in the bore of said lock body adapted for engagement with said shackle to maintain said locking bar in a closed position, a movable pin carried by said lock body to engage said bolt, and means carried by said lock body for moving said pin so as to release said bolt.

In testimony whereof we affix our signatures in presence of two witnesses.

JOSEPH A. SCOTT.
JOHNSTON STUART VOIGT.

Witnesses:
O. F. BARTHEL,
KARL H. BUTLER.